C. WATTERSTON.
SHAFT LOCK.
APPLICATION FILED MAY 8, 1915.

1,150,406. Patented Aug. 17, 1915.

Witness
Chas. L. Griesbauer

Inventor
Charles Watterston
By Charles D. Davis
Attorney

UNITED STATES PATENT OFFICE.

CHARLES WATTERSTON, OF BIRMINGHAM, ALABAMA.

SHAFT-LOCK.

1,150,406.   Specification of Letters Patent.   Patented Aug. 17, 1915.

Application filed May 8, 1915. Serial No. 26,746.

*To all whom it may concern:*

Be it known that I, CHARLES WATTERSTON, a citizen of the United States of America, and a resident of Birmingham, county of Jefferson, State of Alabama, have invented certain new and useful Improvements in Shaft-Locks, of which the following is a full and clear specification, reference being had to the accompanying drawings, in which—

Figure 1:
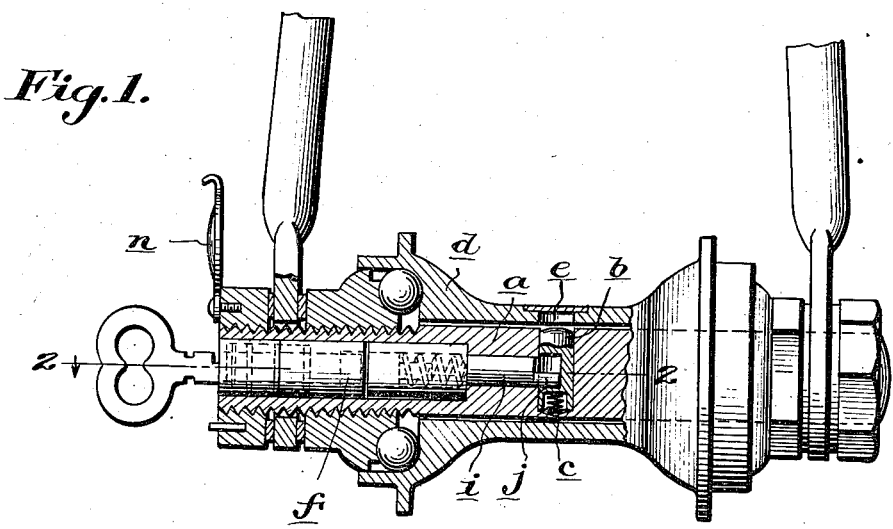
Figure 2:
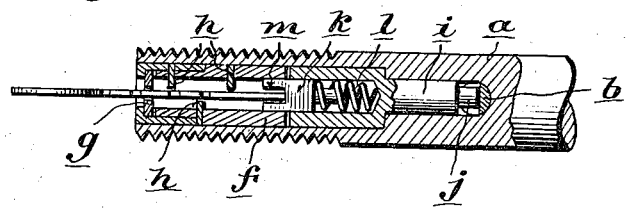
Figure 3:
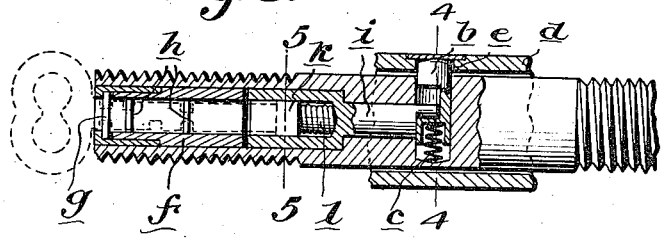
Figure 4:
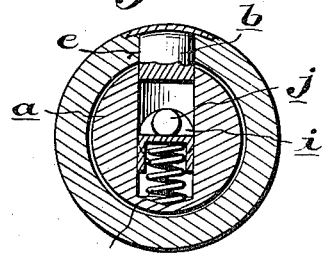
Figure 6:
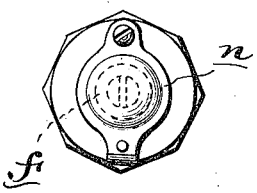
Figure 5:
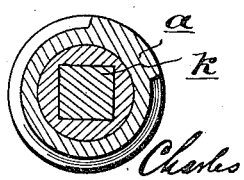

Figure 1 is a view, partly in side elevation and partly in section, of the front axle of a bicycle or motor cycle showing my invention applied thereto; Fig. 2 a detail longitudinal sectional view of an axle having my invention fitted thereto; Fig. 3 a view substantially like Fig. 2, but taken on a plane at right angles to the plane on which said section is taken; Figs. 4 and 5 are transverse sections on the lines 4 and 5, respectively, of Fig. 3; and Fig. 6 an end view of an axle showing the dust cap in closed position.

The object of this invention is to provide a simple key-controlled device for locking relatively rotatable concentric members together, whether the inner member or shaft be the rotatable or the stationary member, as more fully hereinafter set forth.

In my drawing, I have illustrated my device as applied to a stationary shaft, such as the axle of the front wheel of a bicycle or motor cycle, but it will be understood that my invention has a wide range of application.

In the drawing, it will be seen that the axle $a$ is provided with a transverse recess in which is mounted a lock pin $b$ which normally tends to project radially by means of a coil spring $c$. Circumferentially coincident with the lock pin, the hub $d$ is provided with a recess $e$ adapted to receive the outer end of the pin $b$. It will be seen that when the pin $b$ is released, it normally projects radially beyond the circumference of the axle and bears upon the interior of the wall of the hub until the hub rotates far enough to bring the recess $e$ into radial alinement with the pin $b$, whereupon said pin snaps into the recess $e$ and thus locks the hub against rotation on the axle.

For releasing and withdrawing the radial lock pin $b$, I employ the following devices: The axle is bored out axially at one end to receive a key-cylinder $f$ which has mounted in its outer end a rotatable key guide $g$ and is affixed to the axle in any suitable manner by brazing or keying. The interior of the key-cylinder is provided with a suitable number of inwardly projecting parts $h$ which are virtually the tumblers of the lock, since they are so arranged as to prevent the key being turned until the notches in the edges of the key come opposite these projections. It will be understood, of course, that the positions of these lugs $h$ are to be varied in the factory, so as to adapt the locks for different keys, and it will be seen that this arrangement of inwardly projecting lugs will give me a sufficiently wide range of variation for all practical purposes.

Rotatably mounted in the axle, at a point between the inner end of the key-cylinder $f$ and the lock pin $b$, is a rotatable shaft $i$ provided at its inner end with an eccentric pin $j$ which projects into a recess formed in the pin $b$. The other end of the shaft $i$ is enlarged to a diameter corresponding to the diameter of the key-cylinder and is provided with an axial recess square in transverse section. In this recess is slidably mounted a locking block $k$ whose outer end is normally projected into the adjacent inner end of the key-cylinder by means of a coil spring $l$ arranged behind the block, said adjacent end of the key-cylinder being internally square to receive the outer end of the block $k$ and thus lock the shaft $i$ against rotation. The outer end of the block $k$ is provided with a transverse notch $m$ for the reception of the inner flat end of the key.

It will be observed that when the key is pushed in, the block $k$ will be pushed back into its recess in the shaft $i$ far enough to release the shaft $i$ from locking engagement with the fixed key-cylinder $f$ so that by turning the key the shaft $i$ will be rotated. With this arrangement, it will be seen that the shaft $i$ may be turned so as to cause the eccentric pin $j$ to either release the locking pin $b$ or withdraw it and hold it in unlocked position.

It will be understood that a suitable swinging dust cap $n$ may be employed to cover the key-hole, and it will also be understood that numerous changes in the specific construction of my device may be made without departing from the spirit of my invention.

Having thus described my invention, what I claim is:

1. The combination with relatively rotatable members, the inner member being provided with a locking pin adapted to project into engagement with the outer member, the outer member being provided with a recess for receiving the locking pin to thereby lock the two members together, and key-controlled means mounted on the inner member for withdrawing the locking pin or releasing it, said means embodying a rotatable shaft journaled axially in the inner member and having one end in engagement with said locking pin.

2. The combination with concentric relatively rotatable members, the inner member being provided with a radial passage and the outer member being provided with a recess circumferentially coincident with said passage, of a radial locking pin mounted in the passage in the inner member, and means mounted on the inner member for projecting or withdrawing the locking pin, said means embodying a short rotatable shaft inclosed in the inner member and having an eccentric at its inner end engaging said locking pin.

3. In a key-controlled shaft-lock, the combination with two relatively rotatable members arranged one within the other, a radially arranged locking pin adapted when projected to engage the outer member, means on the inner member for controlling the movement of the locking pin, said means consisting of a rotatable shaft having one end in engagement with the locking pin, a key-cylinder affixed to the inner member and carrying projections registering with the notches of the key the device is adapted to be used with, and a spring-actuated square locking block normally connecting the key-cylinder with the aforesaid shaft, for the purpose set forth.

4. In a key-controlled shaft-lock, the combination with two relatively rotatable members arranged one within the other, the outer member being provided with a recess, a radially arranged locking pin adapted when projected to engage said recess, key-controlled means on the inner member for controlling the movement of said locking pin, said means consisting of a short shaft inclosed in the inner member and having its inner end in engagement with said locking pin, a key cylinder affixed to the inner member and serving to hold said shaft in place, and a key-operated device for locking said shaft to said key cylinder.

In testimony whereof I hereunto affix my signature.

CHAS. WATTERSTON.

Witnesses:
 A. E. SMITH,
 J. S. HAWES.